Jan. 17, 1950  J. R. URSCHEL ET AL  2,494,914
MACHINE FOR CLIPPING ONIONS AND THE LIKE
Filed Sept. 13, 1944  3 Sheets-Sheet 1

Inventors:
Joe R. Urschel &
Gerald W. Urschel.
By Stone, Artman & Bisson
Attys.

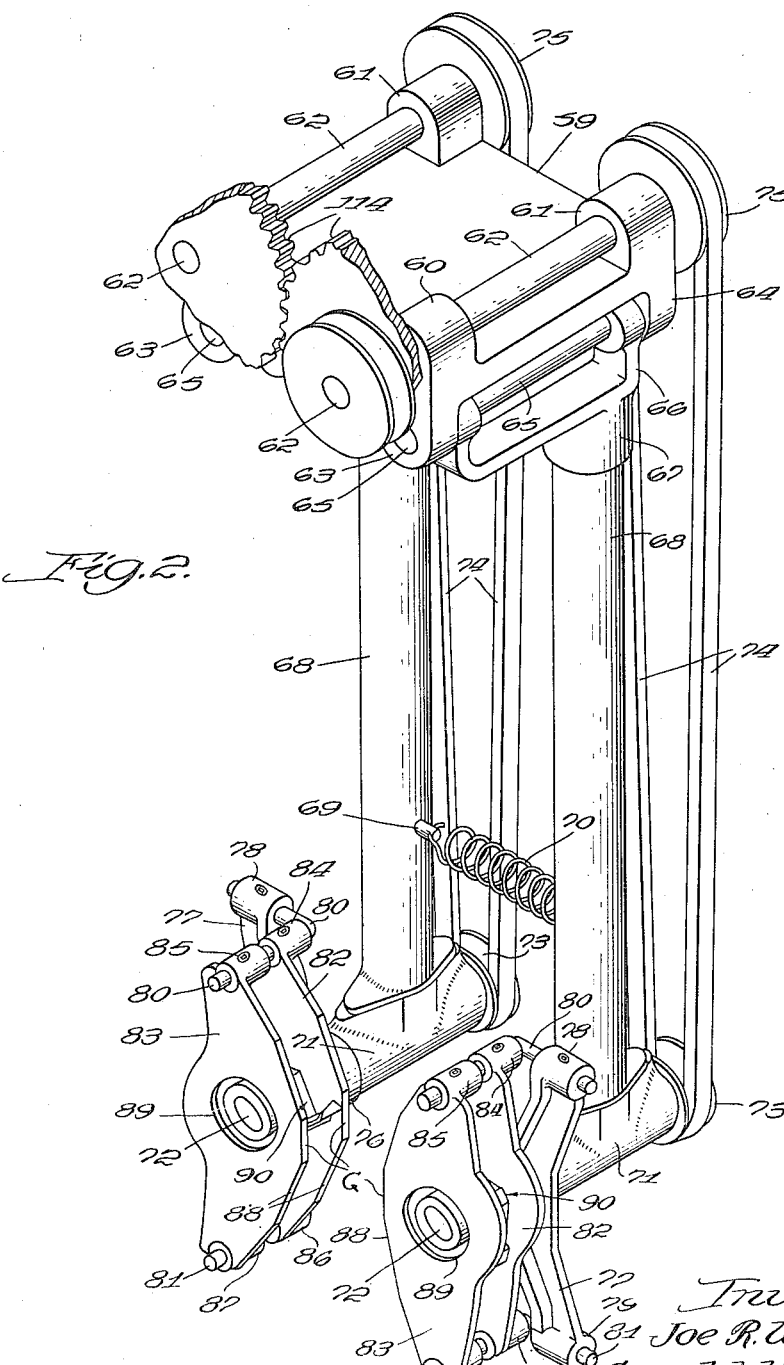

Jan. 17, 1950   J. R. URSCHEL ET AL   2,494,914
MACHINE FOR CLIPPING ONIONS AND THE LIKE
Filed Sept. 13, 1944   3 Sheets-Sheet 3
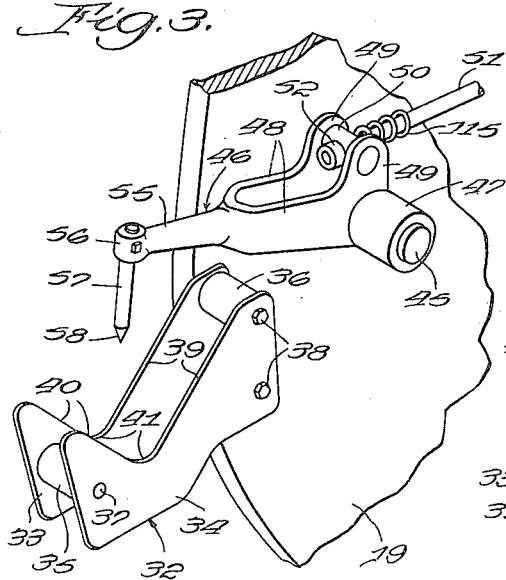
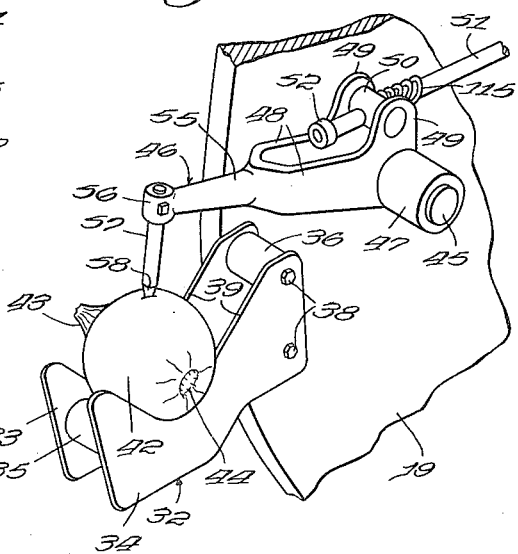
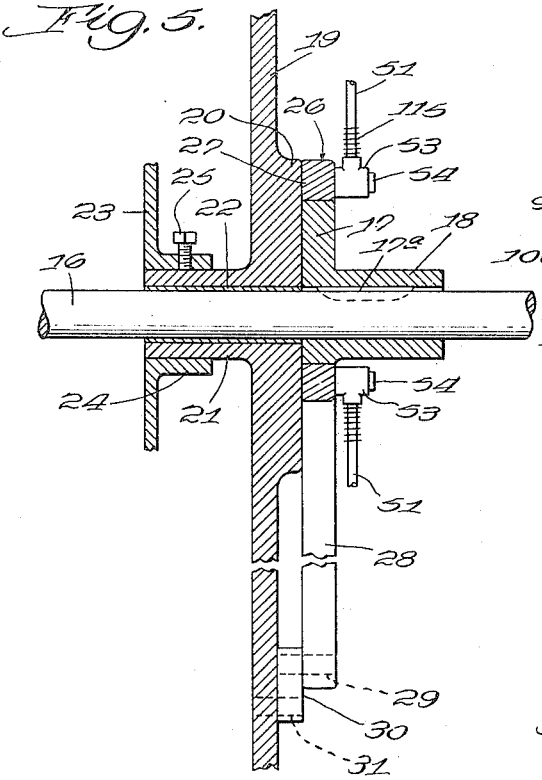
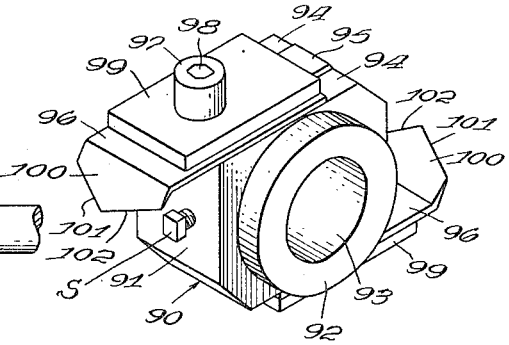
Inventors:
Joe R. Urschel &
Gerald W. Urschel.
By Stone, Artman & Bisson
Attys.

Patented Jan. 17, 1950

2,494,914

UNITED STATES PATENT OFFICE 2,494,914

MACHINE FOR CLIPPING ONIONS AND THE LIKE

Joe R. Urschel and Gerald W. Urschel, Valparaiso, Ind.

Application September 13, 1944, Serial No. 553,868

16 Claims. (Cl. 146—83)

The present invention relates to a machine for cutting or clipping off end portions, such as protruding root and stem end portions, remaining on the body or bulbous part of a plant, vegetable or fruit, such as onions, beets, or the like. The term "onions" herein used is to be taken in the generic sense as meaning any bulbous part of a plant or the like.

Heretofore, in the processing of onions, the undesirable parts or portions of the onion body, such as end portions, were removed manually with the use of paring knives. Among the purposes for removing such parts or portions was to remove dirt, and foreign material; to facilitate an easy peeling of the outer layer of the onion; and to remove the remaining stub of the root and stem. The top portion or outer layer of the onion is removed because dirt usually is held there between the layers of the skin. The lower portion, where the root is attached, is removed because dirt is usually held in and between the root hairs or fibers. Also, a small core usually forms part of the root of the onion which often ruins the flavor of the onion product. After the ends, such as the root and stem end portions, are removed it is then easy to remove the outer skin of the onion by tumbling or by bumping the onion against abrasives or other similar surfaces. If the ends, such as the root and stem stubs, be not removed it is difficult to loosen the outer husk or peel.

The ends of onions have been removed by manually pushing or pressing the onion against a revolving knife, first removing one end and then turning the onion around to remove the other end. That was slow, unsatisfactory and dangerous. There was no easy way to gage the amount to be cut off and there was always great danger of the operator's hand being cut by the knife. In other cases the onion was manually placed in a pocket or cup having open ends across which knives would be moved to cut off the protruding ends of the onion at such openings. When machines were thus made and used they were complicated and dirt and grit carried by the onions would gather in and cause rapid wear of the parts of the machine, especially the bearings and the like.

Among the objects of the present invention is to provide a novel and simple device for removing the ends of onions and wherein there is on chance for dirt or the like to clog or cause wear of any of the parts, the cutting action occurring at a point or locus remote from any of the relatively moving parts of the machine. In a particular structure illustrative of the invention, a rotating wheel carries a series of cradles in which the onions are placed so that the ends of the onions to be cut off protrude or project beyond the sides of the cradles and means is provided to clamp the onion on the cradle so that the onion is held firmly in place until the cradle automatically passes by cutters, remote from the operating and relatively moving parts of the machine, when the ends, both ends, of the onion are simultaneously cut and then the onion is released and let fall into a collecting means. In that way a pre-determined amount only is cut off, automatically, and according to a given and adjusted gage. In that way the speed of processing is greatly increased and all danger of injury to the operator is removed or eliminated, and, also, because the cutting is done remote from the relatively moving parts there is no possibility of any dirt or other foreign matter causing wear or other injury or damage to such parts.

Other objects, advantages, capabilities, features and the like are comprehended by the invention as will later appear and as are inherently possessed by the invention.

Referring to the drawings:

Fig. 2 is a view in perspective of a part of the device, on an enlarged scale with parts broken away;

Fig. 3 and 4 are fragmentary perspective views of certain detail parts;

Fig. 5 is a fragmentary sectional view taken in a plane represented by line 5—5 in Fig. 1 of the drawings; and, Fig. 6 is a perspective view of a rotary cutting unit.

Figure 1:
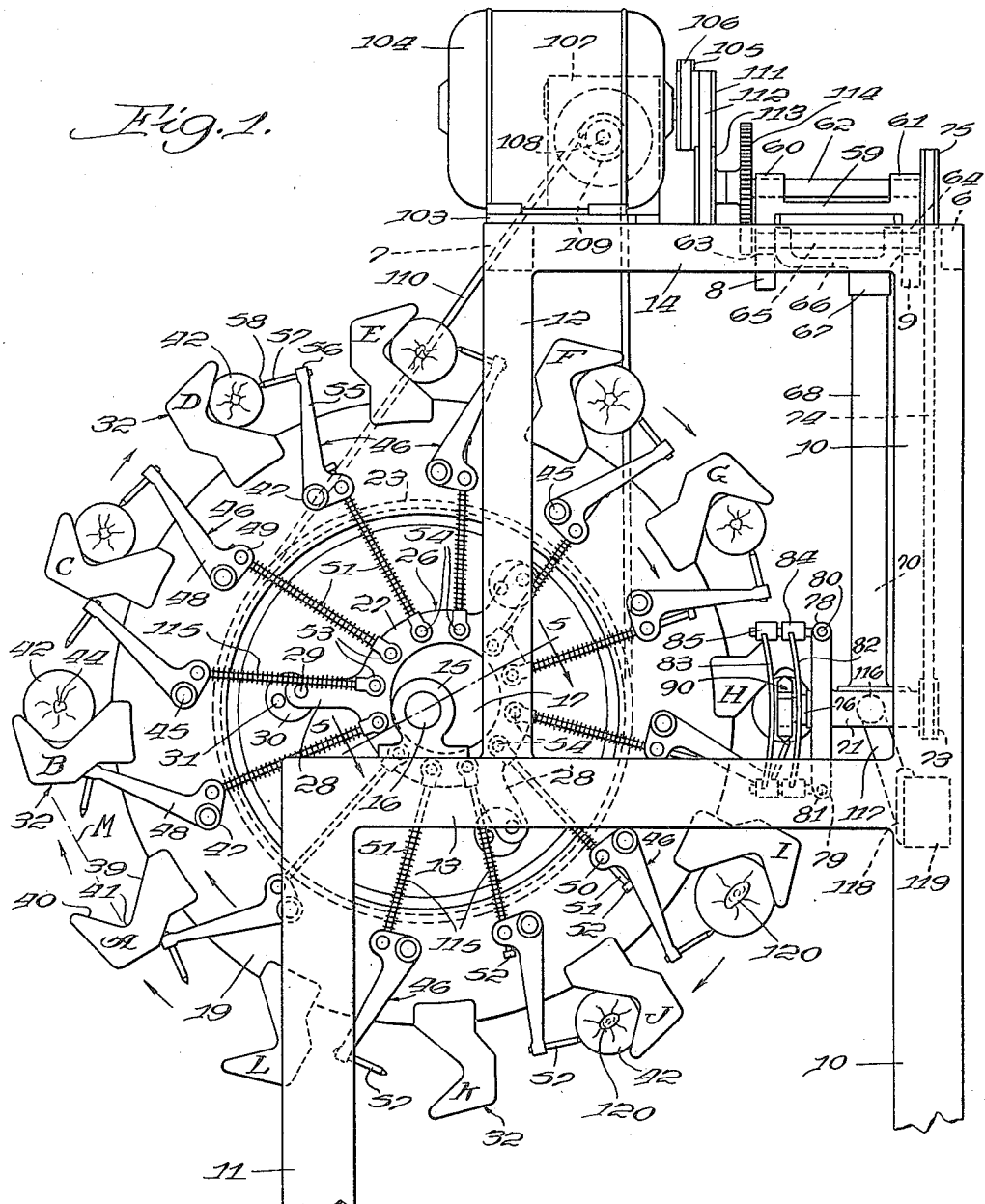
Fig. 1 is a side view in elevation of a device constructed in accordance with the invention.

Referring more in detail to the drawings, the embodiment selected to illustrate the invention is shown as comprising an open frame structure having spaced frame sides suitably rigidly connected by suitable cross members, each frame side comprising upright frame posts 10, 11 and 12 and horizontal frame supporting members 13 and 14, as shown in Fig. 1. The upper ends of the posts 10 and 12 are connected to cross members 6 and 7, shown in dotted lines in Fig. 1. On each of the horizontal frame supporting members 13 is fixed in stationary position a shaft bracket 15 and in these brackets 15 are secured in stationary position the end portions of a shaft or bar 16. On this shaft or bar 16 is fixed or keyed an eccentric 17 so that this eccentric is also in stationary position. The eccentric 17 may have a hub 18 (see Fig. 5) which is suitably secured or fixed to the shaft 16 by a suitable key means 17a.

On the shaft 16 is rotatably mounted a wheel 19 which may be of disc form and which may have a major hub portion 20 and a minor hub portion 21 adapted to rotate on a bearing sleeve 22 fixed in any suitable manner to the shaft 16. The major hub portion 20 may have lateral bearing contact with the eccentric 17, as shown in Fig. 5. On the minor hub portion 21 is secured a sprocket wheel 23 which may have a hub portion 24 suitably secured or fixed to the minor hub portion 21 of the wheel 19, as by way of a set screw 25, as shown in Fig. 5. On the periphery of the eccentric 17 is rotatably mounted a spider 26 having an annular body portion 27 and a number of radially extending arms 28. The outer end portions of these arms 28 are provided with pivoting pins 29 which are pivotally connected to connecting links 30, which links may be of disc shape as shown in Fig. 1, and these links 30 are, in turn, connected to pivot pins 31 connected to the wheel 19, as at a side thereof, as shown in Figs. 1 and 5.

Attached to one side of the wheel 19 near the periphery thereof is a circular series of cradles 32 which are spaced from each other along the circle of the series and concentrically with the axis of the wheel 19. Each of these cradles 32 comprises a pair of spaced side pieces or plates 33 and 34 (see Figs. 1, 3 and 4) held in spaced relation by interposed spacer members 35 and 36, as at the end parts of the side plates 33 and 34 and the side plates 33 and 34 and the spacer members 35 and 36 are secured or fastened rigidly together by suitable means, such as screws, rivets, or bolts 37 and 38, and of these the screws or bolts 38 are secured to the peripheral part or portion of the wheel 19 so as to rigidly hold the cradle therewith so it extends radially outwardly mainly beyond the periphery of the wheel 19, as shown in Figs. 1, 3 and 4.

The cradle side pieces or plates 33 and 34 have their upper edges formed with slopes or crop article supporting peripheries 39 and 40 meeting in curved valleys 41 so as to accommodate for different sizes of articles, such as onions 42, to be placed on the cradles. Referring to Figs. 3 and 4 it can be seen that the plates 39 are spaced apart axially of the carrier 19 and transversely of the circular path through which the crop articles are transferred, and referring to the cradle B in Fig. 1 it can be seen that the pairs of article supporting peripheries 39 and 40 on each of the cradle plates 33 and 34 diverge from a medium M extending in the direction of advancement along said path. Fig. 1 shows different sizes of onions 42 being carried by the several cradles 32. Each of the onions 42 is of a generally spherical form or shape so that it will touch or be supported on the cradle at four points on the slopes 39 and 40, and will have a segmental part of the body of the onion 42 disposed between the valley portions 41 of the plates 33 and 34, as may be seen from Fig. 4. Each onion 42 has oppositely disposed projecting portions or stubs 43 and 44 which are the remnants or remaining parts of the root and stem of the onion, and for convenience may be referred to herein as polar stubs. These stubs are cut off or sheared off by the means herein disclosed as forming part of our invention as will later more fully appear. The axis of these polar stubs is substantially perpendicular to the planes of the side plates 33 and 34 of the cradle, and hence also perpendicular to the plane of the wheel 19, and also these polar stubs are disposed near the valleys 39 and 40 so that these valley parts will constitute jaws of the means for cutting or shearing the stubs 43 and 44, as will more fully be disclosed later.

Fixed to a side of the wheel 19 is a series of circularly spaced stub shafts 45. There are as many of these as there are cradles 32. On each of thes stub stafts 45 is mounted a clamping arm 46 which has a hub or sleeve 47 adapted to angularly oscillate or turn on the stub shaft 45, and which also has a pair of spaced legs 48 provided with ears 49 all rigid with the hub 47, as shown in Figs. 3 and 4. In these ears 49 is rotatably or rockably mounted a spindle shaft or arbor 50 and this arbor 50 has a transverse opening or aperture in which is axially slidable a connecting rod 51 which enters in the action of clamping the onion 42 in place on the cradle 32, as later more fully described. The outer end of the rod 51 has suitably fixed to it a stop or tappet collar 52 adapted to engage with and move the arbor 50 radially inward when effecting an unclamping function of the clamping arm 46, as shown in Fig. 3, and adapted to move radially outwardly and away from the arbor 50 during the clamping function of the clamping arm 46, as shown in Fig. 4. The other or inner end of the rod 51 is connected to a socketed bearing strap 53 which is pivotally connected to a pivot stud 54. The pivot stud 54 is fixed to the annular part 27 of the spider 26, as shown in Fig. 1. There are as many clamping arms 46, connecting rods 51 and pivot studs 54 as there are cradles 32, as shown in Fig. 1. On each of the rods 51 is a helical spring 115 which reacts between the arbor 50 and the pivot strap socket 53 to normally move the clamping device 46 to engage the clamping pin 57 with the onion 42, as shown in Fig. 4. The clamping action is effected only by the force of that spring. This is convenient because of the fact that onions vary in size.

The outer end portion of each clamping arm has a shank 55 provided with a socket 56 in which is adjustably connected a clamping pin or spike 57 which may have a pointed or tapered end 58 for engaging with pressure with the onion 42, as shown in Figs. 1 and 4.

On top of the machine is mounted a table or platform 59 as upon cross pieces or bars 8 and 9, as shown in Fig. 1. On the table 59 at each side thereof are bearing hubs 60 and 61 for supporting shafts 62, and depending therefrom at each side bearing hubs 63 and 64 for supporting shafts 65, as shown in Figs. 1 and 2. Pendulously suspended on shafts 65 are yokes 66 having sockets 67 in which are connected the upper ends of pendulous arms 68. To the arms 68 are fixed apertured stubs 69 to which is connected a tension spring 70 which normally tends to swing the arms 68 toward each other. To the lower ends of arms 68 are fixed bearing hubs 71 for rotatively carrying shafts 72, these shafts projecting forwardly and rearwardly beyond the ends of the hubs 71. To the rearwardly projecting end portions of the shafts 72 are fastened pulleys 73 over which run belts 74 which also run over pulleys 75 secured to the projecting rear end parts of the shafts 62, as shown in Fig. 2.

To the forward ends of the hubs 71 are fixed, in any suitable manner, hubs 76 rigid with upstanding brackets 77. Each of these brackets 77 has upper and lower sockets 78 and 79 in which are adjustably held laterally extending arms of bent bracket rods 80 and 81, the forwardly extending arms of these rods 80 and 81 being for supporting gage shoes 82 and 83 having upper sockets 84 and 85 adjustably mounted on the upper forwardly extending arms of the rods 80, and the lower sockets 86 and 87 adjustably mounted on the lower forwardly extending arms of the rods 81. These shoes 82 and 83 are, as shown in Fig. 2, in the nature of curved plates along arcs concentric to the axis of the wheel 19, and are of approximately and generally elliptical form with their inner edge portions 88 more or less of arc shape to afford a progressive movement of the onion end portions along these edges when passing between the two sets of shoes shown, as in Fig. 2. These plates 82 and 83 also have openings 89 of sufficient size to afford ample clearance for the positioning of the rotary cutters later described.

On the forwardly projecting parts of the shafts 72 and in the spaces between the shoes 82 and 83 are adjustably secured cutting devices 90, one of which is shown in perspective in Fig. 6 of the drawings. Each cutting device has a body 91 provided with end hubs 92 and with an opening 93 for receiving the forward part of the shaft 72. Any suitable means as set screws S may be used to adjustably secure the cutting device 90 on the shaft 72. As shown in Fig. 6 the body 91 has upper and lower faces 94 each provided with a guiding rib 95 for a cutting plate 96. This plate 96 is adjustable along the rib 95 and is held in adjusted position by a suitable clamping screw 97 or the like. This clamping screw 97 may have a wrench socket 98. On the plate 96 is a clamping plate 99 which is interposed between the body of the plate 96 and the head of the clamping screw 97 as shown in Fig. 6. An end of the plate 96 is provided with a bent portion 100 having beveled cutting edges 101 and 102 at an obtuse angle to each other, as shown best in Fig. 6. The hub 92 of the cutter head 91 may extend into the openings 89 in the shoe plates 82 and 83, as shown in Fig. 2.

Referring to Fig. 1 on the top of the machine is suitably secured a motor and speed reducer base 103 upon which is suitably mounted an electric motor 104 and a speed reducer unit 107. On the shaft of the motor is fixed a pulley 105 over which runs a belt 106 operatively connected to a companion pulley (not shown) on the speed reducer 107. This speed reducer has an output shaft 108 carrying a sprocket wheel 109 over which runs a chain 110 operatively connected to the sprocket wheel 23 connected to the wheel 19 (see also Fig. 5). Also fixed to the motor shaft is a second pulley 111 over which runs a belt 112 operatively connected to a pulley 113 fast on the nearest shaft 62. On the shafts 62 are secured mutually meshed same sized gears 114 so as to drive the belts 74 by way of the shafts 62 and pulleys 75, in unison.

For the purpose of preventing the shoes 82—83 contacting with each other by the swinging of the pendulous arms 68 toward each other under the force of the spring 70, and incidentally preventing the cutters 90 from clashing with each other, limit stops are located between the bearing hubs 71. As shown in Fig. 1 these stops have heads 116 provided at the upper ends of upwardly extending arms 117 having basal clamps 118 suitably and adjustably fastened to a cross bar or beam 119 connected between the rear posts 10, as shown in Fig. 1. The spring 70 acting by way of the arms 68 normally holds the hubs 71 in contact with the stop heads 116 so as to maintain the given minimum space between the gage shoes 82—83 at the two sides of the device.

In operation, with the motor 104 running, the wheel 19 is rotated in clockwise direction as viewed in Fig. 1, by way of the sprocket wheel 23 and chain 110. At the same time the cutting devices 90 are rotated in the gage shoes 82—83, by way of the shafts 72, pulleys 73, belts 74, and pulleys 75. The operator manually places the onions 42 successively upon the cradles 32, as for example at the position A or B shown in Fig. 1. Each of the onions 42 is placed on the cradle 32 with the stubs 43 and 44 of the onion extending or projecting beyond the sides of the cradle 32. See Fig. 4, for example.

At that point of time the clamping pin 57 is held spaced away from the onion 42. See positions A and B of the cradles 32 shown in Fig. 1. This is by reason of the fact that the head 52 (see Fig. 3) on the rod 51 is engaged with the arbor 50 and is holding the clamping arm 46 so turned on the stub shaft 45 that the clamping pin 57 is the most greatly spaced from the cradle 32. The other or inner end of the rod 55 at that point of position of the device is pivotally connected to the pivot stud 54 on that portion of the spider ring 27, rotating on the eccentric 17, which is nearest the axis of the shaft 16 on which the wheel 19 turns or rotates, the eccentric 17 remaining stationary, but the spider ring 27 turning on the eccentric 17 in consonance with the wheel 19. At that time the coil spring 115 is either not under compressing stress or fully extended.

As the wheel turns further to bring the cradle 32 to further or successive positions such as at positions C, D, E, F, and G, the riding of the spider ring 27 on the eccentric 17 will cause the pivot strap 53 to be cammed away from the axis of the shaft 16, thus sliding the rod 51 through the arbor 50 to move the head 52 away from the arbor 50, and to also compress the spring 115 which, in turn, causes the clamping arm 46 to turn on the pivot stud 45 and to press the clamping pin 57 against the onion 42 to hold it firmly on its cradle 32.

Because the spider 26, and its ring 27, turns about the axis of the eccentric 17 which is offset from or eccentric to the axis of the shaft 16 about which the wheel 19 turns, the shift of the spider 27 relative to the wheel 19 is compensated by a rocking or turning action of the compensating links or discs 30 pivotally connected to the wheel 19 and to the radial arms 28 extending outwardly from the spider ring 27. See Fig. 1.

As the cradle 32 reaches the gage shoes 82—83 the onion end portions adjacently to the projecting polar portions thereof will contact with the curved or like edges 88 of the shoes and slide along said edges so as to cam the shoes apart against the stress of the spring 70. When the onion reaches the straight gauging edges G, the knives will have commenced cutting into the onion polar stubs. The axial depth the knives can reach into the onions is determined by the distance of the gauge edges from the rotational axes of their repectively associated knife units. This axial cutting depth into the onion can be regulated by adjusting the angle rods 80 and 81 in the bracket ends 78 and 79. Once this adjustment has been made, all onions will be cut the same axial depth irrespective of onion length, leaving shear traces as 120 at the onion ends as shown in Fig. 1 at cradle positions I and J. The oversize openings 89 assure clearance over the knife unit hubs 92 when making either axial or lateral adjustment of the gauge plates 82 and 83. Usually, however, axial adjustment of the gauge plates, to cause them to properly register with the polar stubs of a given size onion, will be accompanied by a corresponding axial adjustment of the knives.

After said cutting, the continued movement of the cradle 32 will bring the onion down along the lower portions of the gauging plate edges 88 so the spring 70 will draw the arms 68 toward each other to the limit determined by the stop means 116. The spider ring 27 will so turn on the eccentric 17 that the push rod 51 will slide inwardly through the arbor 50 so the spring 115 will extend to reduce its force on the arbor, and eventually the push rod head will engage the arbor and rotate the clamping arm 46 to release the clamping pin 57 from the onion 42 (see positions J and K), whereupon, at position K the onion drops from the cradle.

Having thus disclosed a preferred form of the invention, we claim:

1. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, rotary clipping means carried by said support and located in a locus radially outward of said peripheral portion and adjacent to the path of travel of said cradles, said rotary clipping means comprising a cutting element for cutting off an end portion of the onion carried by a cradle as said cradle travels by said clipping means in said path of travel, clamping members pivotally connected to said wheel and extending radially outwardly beyond said peripheral portion of said wheel and opposite said cradles, a cam on said shaft and having an axis located in eccentric relation to the axis of said shaft, a spider ring rotatable on said cam, connecting links pivotally connected to said wheel and to said ring for turning said ring on said cam as said wheel turns, connecting means operatively connected to said ring and to said clamping members to move said clamping members to and from clamping position with onions on said cradles as said connecting means moves with said ring.

2. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, rotary clipping means carried by said support and located in a locus radially outward of said peripheral portion and adjacent to the path of travel of said cradles, said rotary clipping means comprising a cutting element for cutting off an end portion of the onion carried by a cradle as said cradle travels by said clipping means in said path of travel, clamping members pivotally connected to said wheel and extending radially outwardly beyond said peripheral portion of said wheel and opposite said cradles, a cam on said shaft and having an axis located in eccentric relation to the axis of said shaft, a spider ring rotatable on said cam and having radially extending arms, connecting links pivotally connected to the ends of said arm and to said wheel for turning said ring on said cam as said wheel turns, and connecting means operatively connected to said ring and to said clamping members to move said clamping members to and from clamping position with onions on said cradles as said connecting means moves with said ring.

3. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, rotary clipping means carried by said support and located in a locus radially outward of said peripheral portion and adjacent to the path of travel of said cradles, said rotary clipping means comprising a cutting element for cutting off an end portion of the onion carried by a cradle as said cradle travels by said clipping means in said path of travel, clamping members pivotally connected to said wheel and extending radially outwardly beyond said peripheral portion of said wheel and opposite said cradles, a cam on said shaft and having an axis located in eccentric relation to the axis of said shaft, a spider ring rotatable on said cam and having radially extending arms, connecting links pivotally connected to the ends of said arm and to said wheel for turning said ring on said cam as said wheel turns, and connecting means operatively connected to said ring and to said clamping members to move said clamping members to and from clamping position with onions on said cradles as said connecting means moves with said ring, said connecting means comprising connecting rods pivotally connected to said ring and slidably connected to said clamping member, and springs on said connecting rods and reacting between said clamping member and said ring.

4. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, rotary clipping means carried by said support and located in a locus radially outward of said peripheral portion and adjacent to the path of travel of said cradles, said rotary clipping means comprising a cutting element for cutting off an end portion of the onion carried by a cradle as said cradle travels by said clipping means in said path of travel, clamping members pivotally connected to said wheel and extending radially outwardly beyond said peripheral portion of said wheel and opposite said cradles, a cam on said shaft and having an axis located in eccentric relation to the axis of said shaft, a spider ring rotatable on said cam and having radially extending arms, connecting links pivotally connected to the ends of said arm and to said wheel for turning said ring on said cam as said wheel turns, and connecting means operatively connected to said ring and to said clamping members to move said clamping members to and from clamping position with onions on said cradles as said connecting means moves with said ring, said connecting means comprising connecting rods pivotally connected to said ring and slidably connected to said clamping member, each of said clamping means having a laterally extending arm, an arbor rotatably carried by said later arm, each of said connecting rods having an end portion thereof connected to a socket member, said socket member being pivotally connected to said ring, the other end of said rod being slidably connected to said arbor and having a head fixed to said other end of said rod for engaging said arbor in one sliding movement of said rod and to move away from said arbor in the other sliding movement of said rod, and a spring on said rod between said socket member and said arbor.

5. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, carrying means on said support, gaging means carried by said carrying means and located in a locus radially outward of said peripheral portion and adjacent to the path of travel of said cradles, rotary clipping means carried by said gaging means and comprising a cutting element for cutting off an end portion of the onion carried by the cradle as said cradle travels by said gaging means in said path of travel, said gaging means having a guiding track to be contacted by the onions as said cradles travel in said path of travel at said locus.

6. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, carrying means on said support, gaging means carried by said carrying means and located in a locus radially outward of said peripheral portion and adjacent to the path of travel of said cradles, rotary clipping means carried by said gaging means and comprising a cutting element for cutting off an end portion of the onion carried by the cradle as said cradle travels by said gaging means in said path of travel, said carrying means being movable on said support and having bracket means; said gaging means being adjustably connected to said bracket means and having a guiding track for engagement of said onions therewith to move said carrying means, and a spring connected to said carrying means to control movement of said gaging means.

7. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, carrying means on said support, gaging means carried by said carrying means and located in a locus radially outward of said peripheral portion and adjacent to the path of travel of said cradles, rotary clipping means carried by said gaging means and comprising a cutting element for cutting off an end portion of the onion carried by the cradle as said cradle travels by said gaging means in said path of travel, said carrying means being movable on said support and having bracket means, said gaging means having spaced gaging shoes, bracket elements for adjustably supporting said shoes and adjustably connected to said bracket means, bearing means on said carrying means, bearing means on said carrying means, said rotary clipping means being rotatably supported in said bearing means and having a head rotatable between said shoes, said cutting element being adjustably connected to said head, and a spring connected to said carrying means to control movement of said gaging means.

8. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, carrying means on said support, gaging means carried by said carrying means and located in a locus radially outward of said peripheral portion and adjacent to the path of travel of said cradles, rotary clipping means carried by said gaging means and comprising a cutting element for cutting off an end portion of the onion carried by the cradle as said cradle travels by said gaging means in said path of travel, said carrying means being movable on said support and having bracket means, said gaging means having spaced gaging shoes, bracket elements for adjustably supporting said shoes and adjustably connected to said bracket means, bearing means on said carrying means, said rotary clipping means being rotatably supported in said bearing means and having a head rotatable between said shoes, said cutting element being adjustably connected to said head, and a spring connected to said carrying means to control movement of said gaging means, said shoes having guiding tracks to be contacted by the onions as said cradles travel in said path of travel at said locus.

9. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, carrying means on said support, gaging means carried by said carrying means and located in a locus radially outward of said peripheral portion and adjacent to the path of travel of said cradles, rotary clipping means carried by said gaging means and comprising a cutting element for cutting off an end portion of the onion carried by the cradle as said cradle travels by said gaging means in said path of travel, said carrying means comprising a pendulous arm pivotally supported at its upper end to said support and having a bearing means at its lower end, a bracket carried by said arm, said gaging means comprising spaced gaging shoes adjustably connected to said bracket means and having openings opposite said bearing means, said clipping means being rotatably supported in said bearing means and extending into the space between said shoes and into said openings, and a spring connected to said pendulous arm to control movement of said gaging means.

10. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, carrying means on said support, gaging means carried by said carrying means and located in a locus radially outward of said peripheral portion and adjacent to the path of travel of said cradles, rotary clipping means carried by said gaging means and comprising a cutting element for cutting off an end portion of the onion carried by the cradle as said cradle travels by said gaging means in said path of travel, said carrying means comprising a pendulous arm pivotally supported at its upper end to said support and having a bearing means at its lower end, a bracket carried by said arm, said gaging means comprising spaced gaging shoes adjustably connected to said bracket means and having openings opposite said bearing means, said clipping means being rotatably supported in said bearing means and extending into the space between said shoes and into said openings, and a spring connected to said pendulous arm to control movement of said gaging means, said shoes having guiding tracks to be contacted by the onions as said cradles travel in said path of travel at said locus.

11. In an onion clipping machine of the character disclosed and having a support, a shaft carried by the support, and a wheel rotatable on said shaft; the combination therewith of a series of onion carrying cradles spacedly arranged along the peripheral portion of said wheel and connected thereto to extend radially outward from said peripheral portion of said wheel, carrying means on said support, gaging means carried by said carrying means and located in a locus radially outward of said peripheral portion and adjacent to the path of travel of said cradles, rotary clipping means carried by said gaging means and comprising a cutting element for cutting off an end portion of the onion carried by the cradle as said cradle travels by said gaging means in said path of travel, said carrying means comprising a pendulous arm pivotally supported at its upper end to said support and having a bearing means at its lower end, a bracket carried by said arm, said gaging means comprising spaced gaging shoes adjustably connected to said bracket means and having openings opposite said bearing means, said clipping means being rotatably supported in said bearing means and extending into the space between said shoes and into said openings, and a spring connected to said pendulous arm to control movement of said gaging means, said clipping means comprising a head which is rotatably in the space between said shoes, and said cutting elements being adjustably connected to said head.

12. In a machine for trimming end sections from crop articles such as onions, a frame, a wheel rotatably mounted on said frame, a series of crop article carrying cradles disposed on the wheel at circumferentially spaced positions thereof, an arm pivotally mounted on said frame and having a bearing swingable therewith generally toward and away from the path traversed by said cradles pursuant to rotation of the wheel, gauging means carried by said arm adjacent to the bearing thereon, rotary trimming means journalled in said bearing and comprising a cutting element for trimming end portions of respective crop articles carried by the cradles as they travel by said gauging means, said gaging means having a profile pressable against the crop articles to limit approach of the clipping means thereto and hence the depth to which the articles are trimmed, said gauging means profile being carried toward the crop articles when the arm is pivoted in one direction, and means yieldably urging the arm to pivot in such direction.

13. In a machine for trimming end sections from crop articles, a frame, a holder carrier rotatively mounted on the frame, a series of crop article holders disposed on said carrier at circumferentially spaced positions to traverse a circular path when the carrier is rotated, an arm pivotably mounted on the frame and having a bearing which is translated generally toward and away from said holder-traversed path when the arm is pivotally vibrated, gauging means on the arm adjacently to said bearing, rotary trimming means journalled in said arm bearing and comprising a cutting element for cutting off end portions of successive crop articles carried by the holders during carrier rotation, said gauging means comprising spaced crop article engaging shoes adjustably connected to said arm and having openings embracing the trimming means but oversize with respect thereto to accommodate such shoe adjustment, said trimming means comprising a rotatable head disposed in the space between said shoes, and a knife blade adjustably connected to said head.

14. A machine for trimming end sections from crop articles, a frame, a holder carrier rotatively mounted on the frame, a series of crop article holders disposed on said carrier at circumferentially spaced positions to traverse a circular path when the carrier is rotated, a shaft mounting structure in an upper portion of said frame, a pair of laterally spaced shafts journalled in said bearing structure at opposite ends of the carrier with their axes disposed generally in the horizontal and generally perpendicularly to the rotational axis of the carrier, one of said shafts being motor-driven and means for driving the other shaft from the one shaft, belt-driving members respectively on and constrained for rotation with said shafts, pendulous arms journalled to swing about axes parallel with and respectively associated with the axes of said shafts, each of said arms having, in a depending portion thereof, a bearing of which the axis is parallel with the shaft axes, said depending arm portions being upon opposite ends of said carrier to move axially thereof incident to swinging of the arms, rotary trimming units respectively journalled in the arm bearings and disposed for advancement generally toward opposite sides of a crop article trimming section of said path when the arms are swung toward one another for simultaneous trimming opposite end portions of crop articles carried through such path section during carrier rotation, means yieldably urging the arms to swing toward one another, gauge members on said arms, said gauge members having profiles for respective engagement with opposite ends of the crop articles while they traverse the trimming section of said path to limit approach of the trimming units to such articles and consequently limit the depth of their cut into their ends, belt-driven members constrained for rotation with the trimming units to rotate the same, said belt-driven members being respectively paired with the belt-driving members, and belts respectively on said pairs of members.

15. In a machine for trimming end sections from crop articles such as onions, a frame, a cradle carrier rotatably mounted on said frame, a series of crop article carrying cradles disposed on the rotatable carrier at circumferentially spaced positions, an arm having a bearing and pivotally mounted on said frame to swing such bearing generally toward and away from the path traversed by the cradles pursuant to carrier rotation, a rotary trimming unit journalled in said bearing, a rotatable belt driving member supported by the frame adjacently to the pivot mounting of said arm, a rotatable belt-driven member constrained for coaxial rotation with the trimming unit to rotate the same, a power transmitting belt connecting said driving and driven members, means yieldably urging the arm to pivot toward the cradle-traversed path to dispose the trimming unit into the course traversed by those crop article sections to be trimmed, and gauge means on said arms, said gauge means having a profile successively engageable by the crop articles to pivot the arm against the force of said urging means and to thus predeterminedly limit protrusion of the trimming unit into the crop articles.

16. In an onion clipping machine having a support and a wheel rotatably mounted on said support; the combination therewith of a series of onion carrying cradles carried upon said wheel at positions spaced circumferentially thereabout, said cradles comprising onion supporting peripheries diverging from a median extending tangentially of the wheel circumference in the direction of wheel rotation, rotary clipping means carried by said support and located in a locus adjacent to the path of travel of said cradles, and said rotary clipping means comprising a cutting element rotatable about an axis extending transversely of the axis about which said wheel is rotatable and projecting axially of such wheel axis at substantially the same radial distance from the wheel axis as the cradle medians for cutting off an end portion of the onions respectively carried by the cradles as said cradles travel by said clipping means in said path of travel.

JOE R. URSCHEL.
GERALD W. URSCHEL.

REFERENCES CITED

The following references are of record in the file of this patent:

UNITED STATES PATENTS

| Number | Name | Date |
|---|---|---|
| 766,403 | Vincke | Aug. 2, 1904 |
| 978,408 | Spill | Dec. 13, 1910 |
| 1,019,031 | Emery et al. | Mar. 5, 1912 |
| 1,326,905 | Birch, Jr. | Jan. 6, 1920 |
| 1,503,625 | Beale | Aug. 5, 1924 |
| 1,553,227 | Feyk et al. | Sept. 8, 1925 |
| 1,878,423 | Nowlin | Sept. 20, 1932 |
| 1,906,438 | Vetch | May 2, 1933 |
| 2,078,177 | Hickman | Apr. 20, 1937 |